E. GUILE.
Hemp Brake.
No. 30,402.
Patented Oct. 16, 1860.
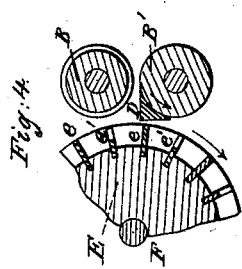
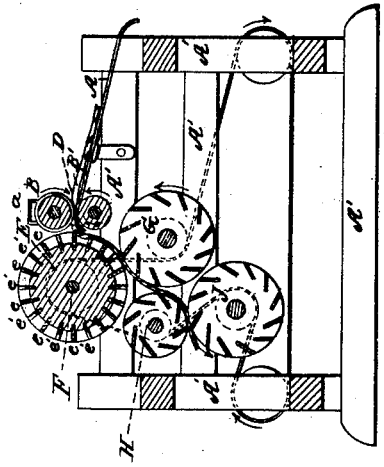
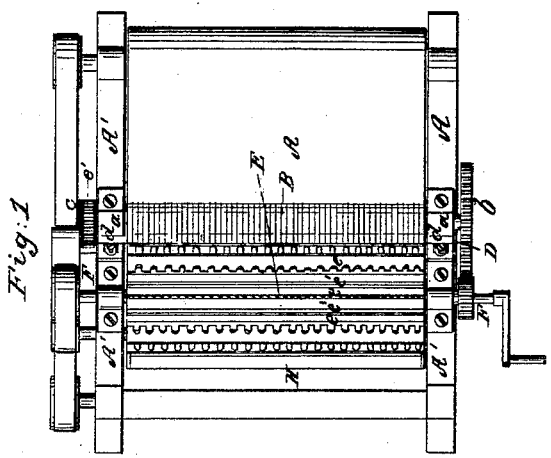
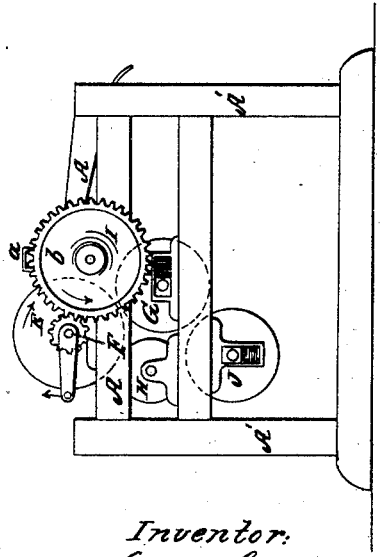
Witnesses:
J. W. Coombs
R. S. Spencer
Inventor:
Ezekiel Guile
per Munn & Co
Attorneys

UNITED STATES PATENT OFFICE.

EZEKIEL GUILE, OF WAVERLY, MISSOURI.

IMPROVEMENT IN HEMP-BRAKES.

Specification forming part of Letters Patent No. 30,402, dated October 16, 1860.

*To all whom it may concern:*

Be it known that I, EZEKIEL GUILE, of Waverly, in the county of Lafayette and State of Missouri, have invented certain new and useful Improvements in Hemp and Flax Breaking Machines; and I do hereby declare that the following is a full, clear, and exact description thereof, reference being had to the accompanying drawings, forming a part of this specification, in which—

Figure 1 represents a plan view of my improved machine; Fig. 2, a side elevation of the same; Fig. 3, a vertical longitudinal section taken through the machine, as indicated by the red line in Fig. 1; Fig. 4, an enlarged view of the feed-rollers and feed-bar.

Similar letters of reference indicate corresponding parts in the several figures.

My invention consists in arranging four slotted cylinders in such a relation to each other and to two crushing feed-rollers and a brake-bar that the stalks of hemp will be acted upon on both sides simultaneously after they are crushed and broken in the operation of separating the shives from the fibers, all as will be hereinafter described.

To enable those skilled in the art to fully understand my invention, I will proceed to describe its construction and operation.

In the drawings, A represents a feed-table, upon which the stalks of flax are placed to be presented to the feed-rollers B B', the several parts about to be described being supported in a frame A'. The feed-rollers pass transversely across the frame A', in front of and close to the table A, and have their bearings in brackets $a\,a$. The upper roller, B, is capable of a slight vertical play in its bearings, thus allowing for the difference in the size and thickness of the stalks. The lower roller, B', is in stationary bearings, and turned in the direction of the arrow, Fig. 3, by a spur-wheel, $b$, on one end of the roller-shaft, which shaft carries on its opposite end to wheel $b$ a pinion-wheel, $c$, that engages with one, $c'$, of the same size on the shaft of roller B, and turns this upper roller in the direction of the arrow, Fig. 3. The upper feed-roller, B, is grooved in such a way that as the stalks of hemp pass between the two rollers the upper roller will split them longitudinally previous to their being subjected to the lateral breaking operation of the cylinders, and thus reduce the stalks to a fit state to be acted upon by the swords of the cylinders to the greatest advantage. The stalks of hemp or flax, as they pass through the feed-rollers, pass over a bar, D, the top surface of which is on a plane with the "bite" of the feed-rollers, as shown in Figs. 3 and 4. This bar extends transversely across the frame parallel with and close to the periphery of the roller B'. It is made adjustable to or from the roller by set-screws $d\,d$, Fig. 1. In front of this bar and the rollers B B' is a drum or cylinder, E, that is surrounded with slats or swords $e\,e'\,e\,e'$, &c., which run parallel with the axis of the cylinder, and their surfaces are in radial lines with the cylinder's axis. These swords are placed at suitable distances apart, and the edge of every other sword is toothed, as represented in Fig. 1, which has the effect of opening and cleaning off the shives immediately after each preceding sword performs its work of breaking the stalks. This slotted cylinder moves in the same direction as the grooved feed-roller B, and receives its motion directly from the main driving-shaft F, on which shaft the cylinder is placed.

Below the cylinder E, and a little in the rear of it, is a slotted drum, G, made up of slats, plain and toothed alternately, which are arranged in the manner represented in Fig. 3, or they may be arranged like those on cylinder E. This drum is rotated in the direction indicated by the arrows in Fig. 3. In front of this drum G is arranged a small drum, H, constructed of slats placed in the same manner as in drum G. This latter drum is much smaller than the one behind it, and it is turned in an opposite direction to this drum G; and below the drums G H is another drum, J, which is placed in such a relation to said drums that the hemp or flax is drawn down between the three drums, the drum J moving in the same direction as drum G, and discharged in front of the machine, as shown in Fig. 3, indicated by the red lines therein. The drums are all driven in their proper direction and at a suitable relative speed by a system of belts and pulleys that are arranged on one side of the machine.

Now, it is the general arrangement of the several parts—the feed-rollers, beating and cleaning cylinders—that constitutes my invention, which will be more clearly understood by the following description of the operation of the machine. The stalks of hemp or flax are placed on the table A and brought up to the rollers B B', which draw them into the machine and break or crush them in the direction of their lengths. They are in this crushed state brought up close to the edges of the sword and toothed slats by the bar D, which is made adjustable to suit the various conditions of the hemp or flax. The stalks receive their first beating at the edge of the bar or shelf D by the large cylinder E. They are then fed down upon the drum G, and again acted upon by the swords of cylinder E between the swords of drum G, where they receive the second beating and breaking and cleaning. From cylinder E and drum G the stalks pass between drums H J, where the hemp or flax is finished and perfectly cleaned of its extraneous matters.

It will be observed in the last two operations that by giving an inclined position to the swords a better scraping action will be produced upon the stalks, which acts to a very great advantage in cleaning off the ligneous matters from the fiber without injuring or tangling the same; but it is not essential that the slats or cylinders G, J, and H should be inclined, for where these cylinders are arranged as represented in Figs. 2 and 3 the cleaning will be effected with slats radiating from the axes of the cylinders, as in cylinder E.

Having thus described my invention, what I claim as new, and desire to secure by Letters Patent, is—

The combination and relative arrangement of the feed and crushing rollers B B', the upper roller, B, being transversely fluted, and brake-bar D, with the beating cylinder E and cleaning and beating drums G H J, all arranged and operating in the manner and for the purposes herein described and represented.

EZEKIEL GUILE.

Witnesses:
   R. M. SLAUGHTER,
   C. H. COLLINS.